US012681465B2

(12) United States Patent     (10) Patent No.:   US 12,681,465 B2
Braun et al.     (45) Date of Patent:     Jul. 14, 2026

(54) GATEWAYS FOR CONNECTING DATA-DRIVEN CONTROL SYSTEMS TO OPC UA ENTITIES

(71) Applicant: ABB Schweiz AG, Baden (CH)

(72) Inventors: Roland Braun, Niederkassel (DE); Mario Hoernicke, Landau (DE); Katharina Stark, Weinheim (DE); Nicolai Schoch, Heidelberg (DE); Sten Gruener, Laudenbach (DE)

(73) Assignee: ABB Schweiz AG, Baden (CH)

( * ) Notice: Subject to any disclaimer, the term of this patent is extended or adjusted under 35 U.S.C. 154(b) by 612 days.

(21) Appl. No.: 18/161,207

(22) Filed: Jan. 30, 2023

(65) Prior Publication Data

US 2023/0244216 A1     Aug. 3, 2023

(30) Foreign Application Priority Data

Jan. 31, 2022     (EP) ..................................... 22154299

(51) Int. Cl.
    *H04L 12/24*       (2006.01)
    *G05B 19/418*       (2006.01)
    *H04L 41/0803*       (2022.01)
(52) U.S. Cl.
    CPC ... *G05B 19/4186* (2013.01); *G05B 19/41835* (2013.01)
(58) Field of Classification Search
    CPC .......... G05B 19/4186; G05B 19/41835; G05B 19/4185; H04L 67/565; H04L 67/12; H04L 12/66; H04L 67/125
    USPC ....................................................... 709/218
    See application file for complete search history.

(56) References Cited

U.S. PATENT DOCUMENTS

| | | | | | |
|---|---|---|---|---|---|
| 2009/0248384 | A1* | 10/2009 | Gienke | .............. | G05B 19/0423 |
| | | | | | 710/305 |
| 2017/0038754 | A1* | 2/2017 | Lo | .......................... | G05B 19/05 |
| 2017/0201425 | A1* | 7/2017 | Marinelli | ............ | G06F 11/3058 |
| 2018/0088548 | A1* | 3/2018 | Sangi | ...................... | F01K 13/02 |
| 2018/0347842 | A1* | 12/2018 | Zhang | ...................... | G06F 9/541 |
| 2020/0304567 | A1* | 9/2020 | Asikainen | .............. | H04L 67/12 |

(Continued)

OTHER PUBLICATIONS

European Patent Office, Extended European Search Report in European Patent Application No. 22154299.6, 11 pp. (Jul. 15, 2022).

*Primary Examiner* — Ario Etienne
*Assistant Examiner* — Elizabeth Kassa
(74) *Attorney, Agent, or Firm* — Fitch Even Tabin & Flannery LLP

(57)       ABSTRACT

A first gateway device for connecting an OPC UA client to a data-driven controller and/or control system includes a first interface implementing an OPC UA server and is configured to receive, from the OPC UA client, at least one call to invoke an OPC UA method on an OPC UA object, and a second interface that sends a request to write at least one value to at least one control variable of the data-driven controller and/or control system, and first translation logic therebetween. A second gateway device connects a data-driven controller and/or control system to a controlled device or subsystem of an industrial plant and includes a third interface that receives a value of a control variable, and a fourth interface that sends a call to invoke an OPC UA method on an OPC UA object, and second translation logic therebetween.

14 Claims, 2 Drawing Sheets

(56)             References Cited

U.S. PATENT DOCUMENTS

| | | | | |
|---|---|---|---|---|
| 2022/0010935 A1* | 1/2022 | Knott | .................. | G05D 16/208 |
| 2022/0276641 A1* | 9/2022 | Thomas | ............. | G05B 19/0423 |
| 2022/0345444 A1* | 10/2022 | Theis | .................. | G06F 16/289 |
| 2023/0171316 A1* | 6/2023 | Kang | .................... | G06Q 50/06 |
| | | | | 709/224 |

\* cited by examiner

GATEWAYS FOR CONNECTING DATA-DRIVEN CONTROL SYSTEMS TO OPC UA ENTITIES

CROSS-REFERENCE TO RELATED APPLICATIONS

This patent application claims priority to European Patent Application No. 22154299.6, filed on Jan. 31, 2022, which is incorporated herein in its entirety by reference.

FIELD OF THE DISCLOSURE

The present disclosure relates to providing connectivity between data-driven controllers and/or control systems on the one hand, and OPC UA clients, controlled devices or subsystems on the other hand.

BACKGROUND OF THE INVENTION

Programmable logic controllers in industrial control systems, and distributed control systems as a whole, have traditionally been data-driven. That is, they commanded to-be-controlled devices by writing output values to certain I/O ports to which the to-be-controlled devices were connected.

More modern to-be-controlled devices may be accessed via OPC UA. The OPC UA framework is object-oriented. That is, to call upon a functionality of the device, methods are invoked on objects. But process controllers have a long service life, and it is not economical to change to new controllers for the sole reason that they speak OPC UA. Co-pending, to-be-published European patent application EP20207190.8 discloses an interface device for connecting a process controller to one or more OPC UA peer devices.

As used in the present disclosure, OPC UA refers to an Open Platform Communication Unified Architecture, which is a cross-platform, open-source, IEC62541 standard for data exchange from sensors to cloud applications developed by the OPC Foundation.

BRIEF SUMMARY OF THE INVENTION

In one general aspect, the present disclosure is directed to systems and methods that facilitate communication between data-driven controllers and/or control systems that are configured to communicate via control variables with superordinate OPC UA systems, to-be-controlled devices or to-be-controlled subsystems. In one embodiment, a first gateway device for connecting an OPC UA client to the data-driven controller and/or control system is used, as well as a second gateway device for connecting the data-driven controller and/or control system to a controlled device or subsystem.

BRIEF DESCRIPTION OF THE SEVERAL VIEWS OF THE DRAWING(S)

DETAILED DESCRIPTION OF THE INVENTION

Figure 1:
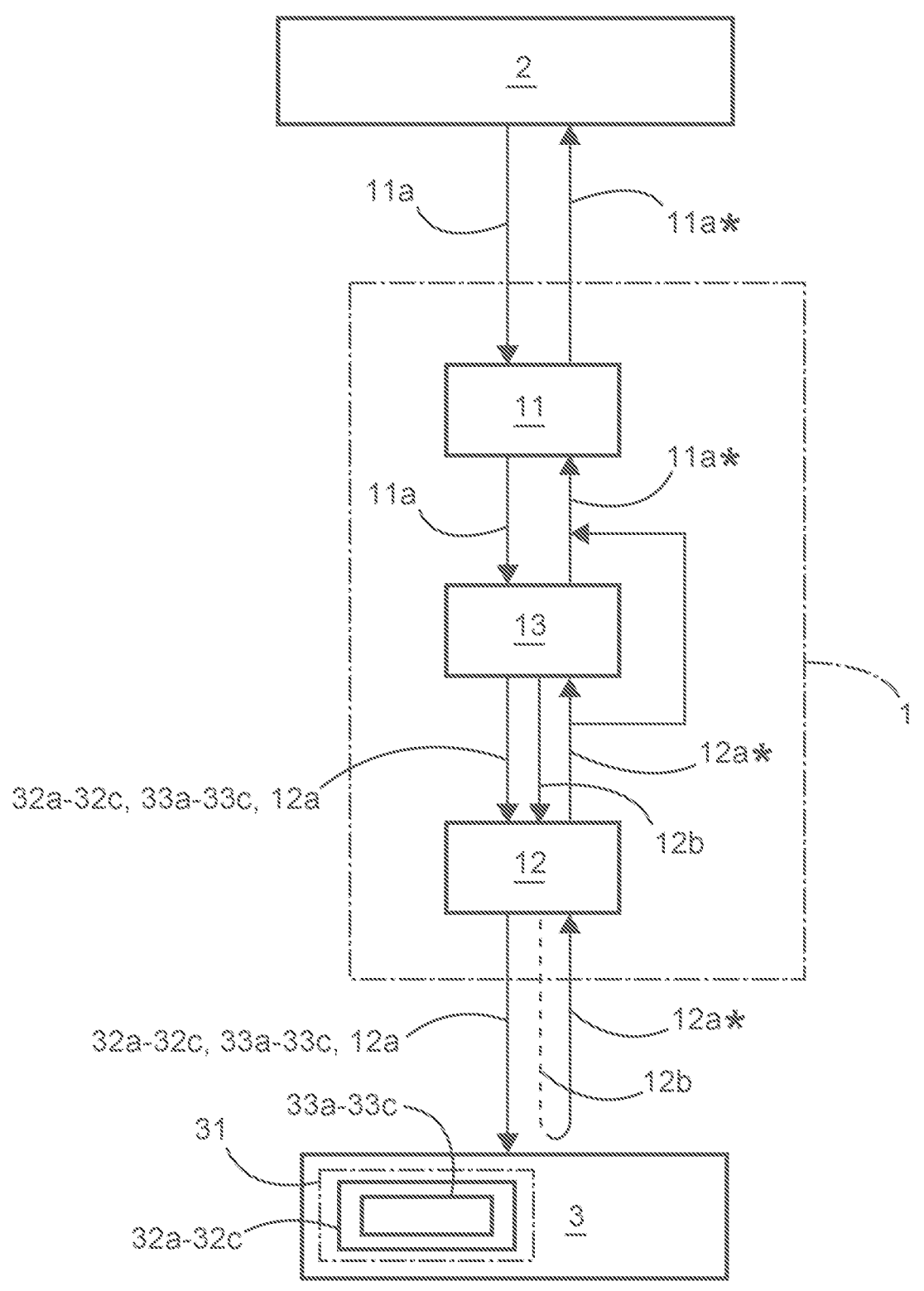
FIG. 1 is a block diagram of an exemplary embodiment of the first gateway device for connecting an OPC UA client to a data-driven controller and/or control system in accordance with the disclosure.

FIG. 1 is a block diagram of an exemplary embodiment of a first gateway device 1 for connecting an OPC UA client 2 to a data-driven controller and/or control system 3.

The OPC UA client 2 is configured to emit calls 11a to invoke OPC UA methods on OPC UA objects. That is, in the information model of the OPC UA client 2, the data-driven controller and/or control system 3 is represented by one or more OPC UA objects and OPC UA methods that may be invoked on these objects. It is the job of the first gateway device 1 to translate the calls 11a into accesses to control variables 32a-32c that the data driven controller and/or control system 3 uses to communicate with the outside world.

The first interface 11 of the first gateway device 11 implements an OPC UA server and is configured to receive the call 11a to invoke an OPC UA method on an OPC UA object from the OPC UA client 2.

The purpose of the call 11a is to trigger a control function in the data driven controller and/or control system 3 that achieves some intended effect. The first translation logic 13 of the first gateway device 11 translates the call 11a into a combination of at least one control variable 32a-32c and at least one value 33a-33c to be written to this control variable 32a-32c, such that, when this value 33a-33c is actually written to the control variable 32a-32c, the intended effect is achieved. As discussed before, the call 11a may be directly translated into a corresponding combination of a control variable 32a-32c and a value 33a-33c according to a pre-set correspondence that may, for example, be read from a configuration file. But it is also possible to first derive the intended effect from the call 11a and then find the combination of the control variable 32a-32c and the value 33a-33c that achieves this effect.

Either way, the first translation logic 13 generates the request 12a to write the value 33a-33c to the control variable 32a-32c. The request 12a is sent to the data-driven controller and/or control system 3 by the second interface 12 of the first gateway device 1. That is, in the relationship between the second interface 12 and the data-driven controller and/or control system 3, the second interface 12 has the role of a client, and the data-driven controller and/or control system 3 has the role of a server. The writing of the value 33a-33c to the control variable 32a-32c triggers the control function of the control logic 31 in the data-driven controller and/or control system 3 that the OPC UA client 2 originally intended to trigger by emitting the call 11a.

When the triggered control function produces an output 12a*, this output 12a* may be obtained by the second interface 12. The first interface 11 may then include this output 12a* in a service result 11a* returned to the OPC UA client 2 in response to the call 11a. Optionally, the output 12a* may be translated by the first translation logic 13 into a form that is usable for inclusion in the service result 11a*.

Given that the second interface 12 behaves as a client vis-à-vis the data-driven controller and/or control system 3, one way of obtaining the output 12a* is to send, by the second interface 12, to the data-driven controller and/or control system 3, a request to read at least one control variable 32a-32c that comprises the output 12a*. The to-be-read control variable 32a-32c, and thus the appropriate read request 12b, may be determined by the first translation logic 13, based at least in part on the to-be-triggered control function that the first translation logic 13 has determined from the original call 11*a* that it has received from the OPC UA client 2.

Figure 2:
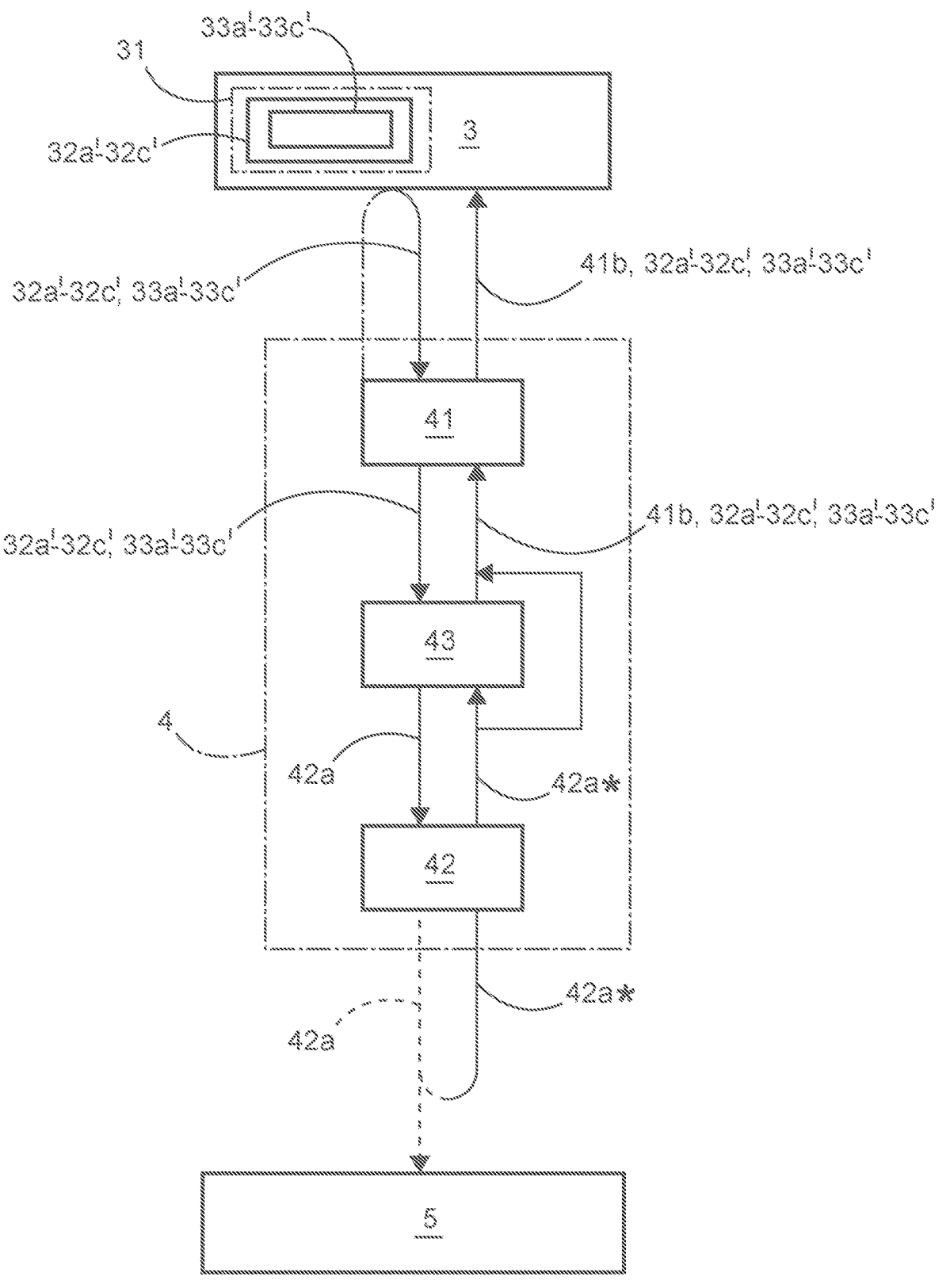
FIG. 2 is a block diagram of an exemplary embodiment of a second gateway device for connecting a data-driven controller and/or control system to a controlled device or subsystem in accordance with the disclosure.

FIG. 2 is a block diagram of an exemplary embodiment of a second gateway device 4 for connecting a data-driven controller and/or control system 3 to a controlled device or subsystem 5 of an industrial plant. In particular, the data-driven controller and/or control system 3 may be the same controller and/or control system 3 that is shown in FIG. 1. The controlled device or subsystem 5 implements an Open Platform Communication Unified Architecture, OPC UA, server and is configured to be controlled by calls to invoke OPC UA methods on OPC UA objects.

The second gateway device 4 comprises a third interface that implements a data-driven client and is configured to receive, from the data-driven controller and/or control system 3, at least one value 33*a*'-33*c*' of at least one control variable 32*a*'-32*c*'. That is, like in FIG. 1, the data-driven controller and/or control system 3 has the role of a server. One way how the third interface 41 as a client may timely obtain new or updated values 33*a*'-33*c*' of the at least one control variable 32*a*'-32*c*' is to monitor, poll, and/or subscribe to, the at least one control variable 32*a*'-32*c*'.

The control variables 32*a*'-32*c*' via which the second gateway device 4 communicates with the data-driven controller and/or control system 3 are usually not the same control variables 32*a*-32*c* that the first gateway device 1 accesses. Rather, an exemplary scenario is that the first gateway device 1 sets some control variables 32*a*-32*c* to values 33*a*-33*c*, and in response to this, the control logic 31 of the data-driven controller and/or control system 3 generates new values 33*a*'-33*c*' for other control variables 32*a*'-32*c*'. These other control variables 32*a*'-32*c*' may then be accessed by the second gateway device 4.

The purpose of setting, by the control logic 31 of the data-driven controller and/or control system 3, the at least one control variable 32*a*'-32*c*' to the at least one value 33*a*'-33*c*' is to achieve some control action on the side of the controlled device or subsystem 5. The second gateway device 4 comprises second translation logic 43 that determines, from the at least one control variable 32*a*'-32*c*' and its value 33*a*'-33*c*', at least one OPC UA object and at least one OPC UA method such that a call 42*a* to invoke this OPC UA method on this OPC UA object achieves the intended effect of setting said control variable to said value, i.e., the intended control action. The second translation logic 43 generates a call 42*a* to invoke the so-determined OPC UA method on the so-determined OPC UA object.

This call 42*a* is sent to the controlled device or subsystem 5 by the fourth interface 42 of the second gateway device 4. If invocation of the OPC UA method on the OPC UA object produces an output 42*a, this output 42*a may be obtained by the fourth interface 42. The third interface 41 may then send a request to write this output 42*a as a value 33***a*'-33*c*' to a control variable 32*a*'-32*c*' to the data-driven controller and/or control system 3. In this manner, the control logic 31 of the controller and/or control system 3 is enabled to process the output 42*a further. Optionally, the output 42*a may be translated by the second translation logic 43 into a suitable combination of a control variable 32*a*'-32*c*' and value 33*a*'-33*c*'.

The disclosure describes a first gateway device for connecting an Open Platform Communication Uniform Architecture, OPC UA, client to a data-driven controller and/or control system. The data-driven controller and/or control system comprises control logic with control functions that are configured to be triggered by writing at least one value to at least one control variable.

The first gateway device comprises a first interface that implements an OPC UA server. That is, the first gateway device may be addressed by the OPC UA client like any normal OPC UA device. The first interface is configured to receive at least one call to invoke an OPC UA method on an OPC UA object from the OPC UA client.

The first gateway device also comprises a second interface that is configured to send, to the data-driven controller and/or control system, a request to write at least one value to at least one control variable of the data-driven controller and/or control system.

In particular, the sending of the request from the second interface to the data-driven controller and/or control system may comprise: applying the value of the at least one control variable as input to an I/O port of the data-driven controller and/or control system that corresponds to the control variable.

The control variable may be made accessible for writing in any suitable manner. In particular, the data-driven controller and/or control system may implement an Open Platform Communication Data Access, OPC DA, server. The second interface may then implement an OPC DA client and be configured to send the request to write the value to said OPC DA server.

The first gateway device further comprises first translation logic. This first translation logic is configured to determine at least one control valuable and at least one value such that the writing of this value to this control variable triggers a control function that achieves the intended effect of performing the OPC UA method on the OPC UA object in the call received from the OPC UA client. The first translation logic is further configured to generate the request to write said value to said control variable.

The determining of the control variable and the value may be performed in one step. For example, the first translation logic may avail itself of a pre-stored correspondence between combinations of OPC UA objects and OPC UA methods on the one hand, and combinations of control variables and values on the other hand. The assignment of OPC UA methods to OPC UA objects introduces a logical order in the sense of what may be done with any given object.

For example, set-points for certain quantitative goals of an industrial process, such as a production rate of a certain product, as objects may have a "Set" method to set them to a new value. The set-point may directly correspond to a control variable, and the calling of the "Set" method on the set-point object may translate to writing the new value into the set-point control variable.

In another example, if the plant is configured to produce one of several possible products at any one time, each such product may correspond to an object of its own, with a method "SwitchTo" that may be invoked in order to switch production over to this product.

The determining of the control variable and the value may also be performed in two or more steps. For example, in a first step, the first translation logic may first determine a control function in the control logic that needs to be invoked. In a second step, the first translation logic may then determine which value to write into which control variable. For example, for a given control function that needs to be invoked, there may be two or more different combinations of control variables and values with which this may be accomplished.

The net effect of the first gateway device is that an existing data-driven controller and/or control system may continue to be operated even though the OPC UA client expects to communicate with the controller and/or control system by calling OPC UA methods on OPC UA objects. Whatever functionality the controller and/or control system provides may be made accessible to the OPC UA client. For example, the first gateway device may be configured to cooperate in a system with a Manufacturing Execution System, MES, as the OPC UA client. The MES is a superordinate system that is to orchestrate a manufacturing process towards a greater goal, such as maximum output or maximum revenue. The MES may give instructions of the kind "increase the set-point of the production quantity of product A to value X" or "switch production from product A to product B". The MES does not want to deal with all the intricacies of how to speak to the particular controller and/or control system, and a plant operator does not want to make any changes to the MES if the controller and/or control system needs to be modified. It is therefore advantageous to keep all the intricacies regarding the communication with the controller and/or control system inside the first gateway device.

In a further advantageous embodiment, the first translation logic is further configured to determine, from at least one argument included with the call to invoke the OPC UA method, at least one further control variable and at least one further value such that the writing of this further value to this further control variable produces the intended effect of the at least one argument. For example, depending on the control logic of the data driven controller and/or control system, the "Set" method on a set-point object may not directly translate to the writing of the new value of the set-point into a corresponding control variable. Rather, the control logic may, for example, expect the changing of a set-point value to be commanded by writing a designation (such as an index) of the set-point value into a first control variable, and writing the actual value into a second control variable. So the calling of the "Set" method translates to a value to be written into the first control variable, and the new set-point value as the argument of the "Set" method translates to a value to be written into the second control variable. One reason why the control logic of the data driven controller and/or control system may require this more complicated manner of changing a set-point value is that this control logic may want to check for invalid set-point values before writing the set-point value into an internal control variable and starting to use it. If this internal control variable cannot be directly written from the outside, the check for invalid set-point values cannot be bypassed.

In a further advantageous embodiment, the first translation logic is further configured to determine, based at least in part on the to-be-triggered control function, a request to read at least one control variable of the data-driven controller and/or control system. This at least one control variable comprises an output generated by the triggered control function. At the same time, the second interface is further configured to send this request to the data-driven controller and/or control system. In this manner, the output generated by the triggered control function may be obtained by the first gateway device. It may then be returned to the OPC UA client as the result of the calling of the method. For example, the OPC UA client may use the output to determine whether the control function executed successfully or whether any errors occurred.

The disclosure also describes a second gateway device for connecting a data-driven controller and/or control system to a controlled device or subsystem of an industrial plant. This controlled device or subsystem implements an Open Platform Communication Unified Architecture, OPC UA, server and is configured to be controlled by calls to invoke OPC UA methods on OPC UA objects.

The second gateway device comprises a third interface that implements a data-driven client and is configured to receive, from the data-driven controller and/or control system, at least one value of at least one control variable. By writing to this control variable, the controller and/or control system indicates that it wants to perform a control action on the controlled device or subsystem.

In particular, the receiving, by the third interface, from the data-driven controller and/or control system, of the at least one value of at least one control variable may comprise: reading the value from an I/O port of the data-driven controller and/or control system that corresponds to the control variable.

The second gateway device also comprises a fourth interface that is configured to send, to the controlled device or subsystem, at least one call to invoke an OPC UA method on an OPC UA object.

The second gateway device further comprises second translation logic. This second translation logic is configured to determine, from the at least one control variable and its value, at least one OPC UA object and at least one OPC UA method such that a call to invoke this OPC UA method on this OPC UA object achieves the intended effect of setting said control variable to said value. The second translation logic is further configured to generate the call to invoke said OPC UA method on said OPC UA object.

The determining of the at least one OPC UA object and OPC UA method may be performed in one step. For example, the second translation logic may avail itself of a pre-stored correspondence between combinations of control variables and values on the one hand, and combinations of OPC UA objects and OPC UA methods on the other hand.

For example, if a set-point for a lower level controller corresponds to a control variable maintained by the controller and/or control system, and this set-point is modelled in the OPC UA model of the controlled device or subsystem as an OPC object, the writing of a new value into this control variable may cause the "Set" method of this OPC object to be called, with the new value as argument.

In another example, the controlled device or subsystem may comprise a plurality of valves that may be open or closed. A desired switching state of the plurality of valves may then be encoded in one single binary number, with a "1" bit for an open valve and a "0" bit for a closed valve, and this number may be written as a value into a control variable "ValvesState". The third interface may obtain this value, and the second translation logic may decode from the value for which objects corresponding to individual valves the "Open" or "Close" method is to be called.

The determining of the OPC UA object and OPC UA method may also be performed in two or more steps. For example, in a first step, the second translation logic may first determine which control action is to be triggered by the writing of the value into the control variable by the controller and/or control system. In a second step, the second translation logic may then determine which OPC UA methods to invoke on which OPC UA objects in order to accomplish this control action. For one single control action, there may be several ways to accomplish this by calling different methods on different objects.

The net effect of the second gateway device is that an existing data-driven controller and/or control system may continue to be operated even though the devices or subsystems to be controlled by it expect to be addressed by calling OPC UA methods on OPC UA objects. In particular, such a situation may arise if a newer device or subsystem is to be controlled by an already existing controller and/or control system. Being closer to the physical execution of the to-be-controlled process, the controlled device or subsystem is subject to much more wear and tear than the controller and/or control system.

The control variable and its value may be communicated to the third interface in any suitable manner. In particular, the data-driven controller and/or control system may implement an Open Platform Communication Data Access, OPC DA, server. The third interface may then implement an OPC DA client and receive the at least one value of the at least one control variable from the OPC DA server of the data driven controller and/or control system.

In a particularly advantageous embodiment, the third interface is configured to monitor, poll, and/or subscribe to, at least one control variable. In this manner, any change to this control variable is propagated via the second gateway device to the controlled device or subsystem without undue delay. In particular, an OPC DA server in the data-driven controller and/or control system typically waits for at least one OPC DA client to retrieve data. If not queried by any OPC DA client, the OPC DA server will remain dormant.

In a further particularly advantageous embodiment, the second translation logic is further configured to determine, for each control action from a given set of control actions that are triggerable on the controlled device or subsystem, at least one control variable that the control logic of the data-driven controller and/or control system is configured to set in order to trigger this control action. The second translation logic is further configured to instruct the third interface to monitor, poll, and/or subscribe to, the so-determined control variable. In this manner, the second gateway listens to all changes to control variables that are relevant in the context of the concrete controlled device or subsystem. If a control variable is not relevant for any control action that may be triggered on the controlled device or subsystem, there is no need for the second translation logic to monitor it.

For example, the second translation logic may be further configured to determine the given set of control actions by querying, from the controlled device or subsystem, a set of available OPC UA objects and OPC UA methods that are invokable on these OPC UA objects. In this manner, the structured nature of the OPC UA information model in the controlled device may be exploited and "crawled" to find all available control actions.

In a further advantageous embodiment, the third interface is further configured to obtain at least one argument to be included with the call from at least one further control variable. At the same time, the fourth interface is further configured to include this argument in the call. For example, in this manner, it can be accommodated if the controller or control system is configured to encode multiple different control actions in different values of one and the same control variable. That is, the value of this control variable merely selects the control action, and an argument needed by this control action is then supplied via the at least one further control variable.

In a further advantageous embodiment, the fourth interface is further configured to obtain an output of the triggered control action in a service result returned from the controlled device or subsystem in response to the call. Also, the third interface is further configured to send, to the data-driven controller and/or control system, a request to write this output as a value to a control variable. In this manner, the control logic of the controller and/or control system is made aware of the result of performing the control action even though this result is delivered by the controlled device and/or subsystem in a completely different information model.

In one advantageous embodiment, the second gateway device is configured to cooperate in a system with subsea installed crude-oil or gas conveyance as the controlled device or subsystem. Equipment of this kind is modernized at a much faster rate than controllers and control systems. Moreover, for this kind of equipment, the MDIS companion specification to OPC UA provides a generally accepted information model. This means that it would be very disadvantageous to control this equipment in a data-driven manner, rather than by means of OPC UA, because this would mean forgoing the benefits of said generally accepted information model.

In the context of one and the same industrial plant, both a first gateway device and a second gateway device described above may be used. The first gateway device and the second gateway device operate on different levels of the "automation pyramid": The first gateway device may sit between a superordinate system, such as a Manufacturing Execution System (MES), and the control system. The second gateway device may sit between the control system and controlled devices or subsystems.

The gateway device may be wholly or partially computer-implemented. The invention therefore also provides one or more computer programs with machine-readable instructions that, when executed by one or more computers and/or compute instances, equip the one or more computers and/or compute instances with the functionality of the first gateway device, and/or with the functionality of the second gateway device, described above. In particular, compute instances may comprise cloud resources, such as virtual machine instances, or execution environments that are configured to run containerized software.

The one or more computer programs may, for example, be marketed on a non-transitory computer-readable storage medium or in the form of a download product that, e.g., allows instant fulfillment after a purchase in an online store. Therefore, the invention also relates to a non-transitory computer-readable storage medium or a download product with the one or more computer programs. The invention also relates to one or more computers with the one or more computer programs, and/or with the non-transitory computer storage medium and/or download product.

LIST OF REFERENCE NUMERALS 1 first gateway device
11 first interface of first gateway device 1
11a call from OPC UA client to invoke OPC UA method on OPC UA object
11a* service result in response to call 11a
12 second interface of first gateway device 1
12a request to write value 33a-33c into control variable 32a-32c
12a* output of control function triggered by request 12a*
12b request to read control variable 32a-32c with output 12a*
13 first translation logic of first gateway device 1
2 OPC UA client
3 data-driven controller and/or control system 3
31 control logic of controller and/or control system 3

32*a*-32*c* control variables of controller/system 3 accessed by gateway 1

32*a'*-32*c'* control variables of controller/system 3 accessed by gateway 4

33*a*-33*c* values of control variables 32*a*-32*c*

33*a'*-33*c'* values of control variables 32*a'*-32*c'*

4 second gateway device

41 third interface of second gateway device 4

41*b* request to write output 42*a** as value 33*a'*-33*c'* to variable 32*a'*-32*c'*

42 fourth interface of second gateway device 4

42*a* call from fourth interface 42 to invoke OPC UA method on OPC UA object 42*a** output of control action triggered by call 42*a*

43 second translation logic of second device 4

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A first gateway device for connecting an Open Platform Communication Uniform Architecture (OPC UA) client to a data-driven controller and/or control system, wherein the data-driven controller and/or control system comprises control logic with control functions that are configured to be triggered by writing at least one value to at least one control variable, the first gateway device comprising:

a first interface that implements an OPC UA server and is configured to receive from the OPC UA client at least one call to invoke an OPC UA method on an OPC UA object;

a second interface that is configured to send to the data-driven controller and/or control system a request to write at least one value to at least one control variable of the data-driven controller and/or control system; and a first translation logic configured to:

determine at least one control variable and at least one value, wherein writing of this value to this control variable triggers a control function that achieves the intended effect of performing the OPC UA method on the OPC UA object in the call received from the OPC UA client; and generate the request to write said value to said control variable, wherein the determining of the control variable and the value is performed either:

in one step based either on a pre-stored correspnodance between combination of OPC UA objects and methods or on combinations of control variable and values; or in two steps by determining a control function in the control logic that need to be invoked in a first step, and then determining which value to write into the control variable in the second step.

2. The first gateway device of claim 1, wherein the second interface implements an Open Platform Communication Data Access (OPC DA) client and is configured to send the request to an OPC DA server implemented by the data-driven controller and/or control system.

3. The first gateway device of claim 1, wherein the first translation logic is further configured to:

determine, from at least one argument included with the call to invoke the OPC UA method, at least one further control variable and at least one further value wherein writing of this further value to this further control variable produces the intended effect of the at least one argument; and generate a request to write said further value to said further control variable.

4. The first gateway device of claim 1, wherein:

the second interface is further configured to obtain, from the data-driven controller and/or control system, at least one output generated by the triggered control function; and the first interface is further configured to include said output in a service result returned to the OPC UA client in response to the call.

5. The first gateway device of claim 4, wherein the first translation logic is further configured to determine, based at least in part on the to-be-triggered control function, a request to read at least one control variable of the data-driven controller and/or control system, wherein this at least one control variable comprises an output generated by the triggered control function, and wherein the second interface is further configured to send this request to the data-driven controller and/or control system.

6. A second gateway device for connecting a data-driven controller and/or control system to a controlled device or subsystem of an industrial plant, wherein the controlled device or subsystem implements an Open Platform Communication Unified Architecture (OPC UA) server and is configured to be controlled by calls to invoke OPC UA methods on OPC UA objects, the second gateway device comprising:

a third interface that implements a data-driven client and is configured to receive, from the data-driven controller and/or control system, at least one value of at least one control variable;

a fourth interface that is configured to send, to the controlled device or subsystem, at least one call to invoke an OPC UA method on an OPC UA object; and second translation logic configured to:

determine, from the at least one control variable and its value, at least one OPC UA object and at least one OPC UA method whereby a call to invoke this OPC UA method on this OPC UA object achieves the intended effect of setting said control variable to said value; and generate the call to invoke said OPC UA method on said OPC UA object, wherein the determining of the OPC UA object and OPC UA method is performed in one step based either on a pre-stored correspnodance between combination of OPC UA objects and methods or on combinations of control variable and values; or in two steps by determining which control action is to be triggered by the writing of the value into the control variable by the controller and/or control system in a first step, and then determining which OPC UA methods to invoke on which OPC UA objects in order to accomplish this control action in a second step.

7. The second gateway device of claim 6, wherein the third interface implements an Open Platform Communication Data Access (OPC DA) client and is configured to receive the at least one value of the at least one control variable from an OPC DA server implemented by the data-driven controller and/or control system.

8. The second gateway device of claim 6, wherein the third interface is configured to monitor, poll, and/or subscribe to, at least one control variable.

9. The second gateway device of claim 8, wherein the second translation logic is further configured to:

determine, for each control action from a given set of control actions that are triggerable on the controlled device or subsystem, at least one control variable that the control logic of the data-driven controller and/or control system is configured to set in order to trigger this control action; and instruct the third interface to monitor, poll, and/or subscribe to, the so-determined control variable.

10. The second gateway device of claim 9, wherein the second translation logic is further configured to determine the given set of control actions by querying, from the controlled device or subsystem, a set of available OPC UA objects and OPC UA methods that are invokable on these OPC UA objects.

11. The second gateway device of claim 6, wherein the third interface is further configured to obtain at least one argument to be included with the call from at least one further control variable; and wherein the fourth interface is further configured to include this argument in the call.

12. The second gateway device of claim 6, wherein the fourth interface is further configured to obtain an output of the triggered control action in a service result returned from the controlled device or subsystem in response to the call;

and wherein the third interface is further configured to send, to the data-driven controller and/or control system, a request to write this output as a value to a control variable.

13. The second gateway device of claim 6, wherein the second gateway device is further configured to cooperate in a system with subsea installed crude-oil or gas conveyance as the controlled device or subsystem.

14. One or more computer programs with machine-readable instructions stored on non-transitory media that, when executed by one or more computers and/or compute instances, equip the one or more computers and/or compute instances with the functionality of at least one of:

a first gateway device, the first gateway device being operable for connecting an Open Platform Communication Uniform Architecture (OPC UA) client to a data-driven controller and/or control system, wherein the data-driven controller and/or control system comprises control logic with control functions that are configured to be triggered by writing at least one value to at least one control variable, the first gateway device comprising:

a first interface that implements an OPC UA server and is configured to receive from the OPC UA client at least one call to invoke an OPC UA method on an OPC UA object;

a second interface that is configured to send to the data-driven controller and/or control system a request to write at least one value to at least one control variable (32a-32c) of the data-driven controller and/or control system; and a first translation logic configured to:

determine at least one control variable and at least one value such that the writing of this value to this control variable triggers a control function that achieves the intended effect of performing the OPC UA method on the OPC UA object in the call received from the OPC UA client; and generate the request to write said value to said control variable;

wherein the determining of the control variable and the value is performed either:

in one step based either on a pre-stored correspnodance between combination of OPC UA objects and methods or on combinations of control variable and values; or in two steps by determining a control function in the control logic that need to be invoked in a first step, and then determining which value to write into the control variable in the second step; or a second gateway device, the second gateway device being operable for connecting a data-driven controller and/or control system to a controlled device or subsystem of an industrial plant, wherein the controlled device or subsystem implements an Open Platform Communication Unified Architecture (OPC UA) server and is configured to be controlled by calls to invoke OPC UA methods on OPC UA objects, the second gateway device comprising:

a third interface that implements a data-driven client and is configured to receive, from the data-driven controller and/or control system, at least one value of at least one control variable;

a fourth interface that is configured to send, to the controlled device or subsystem, at least one call to invoke an OPC UA method on an OPC UA object; and second translation logic configured to:

determine, from the at least one control variable and its value, at least one OPC UA object and at least one OPC UA method such that a call to invoke this OPC UA method on this OPC UA object achieves the intended effect of setting said control variable to said value; and generate the call to invoke said OPC UA method on said OPC UA object, wherein the determining of the OPC UA object and OPC UA method is performed in one step based either on a pre-stored correspnodance between combination of OPC UA objects and methods or on combinations of control variable and values; or in two steps by determining which control action is to be triggered by the writing of the value into the control variable by the controller and/or control system in a first step, and then determining which OPC UA methods to invoke on which OPC UA objects in order to accomplish this control action in a second step.

* * * * *